March 28, 1950     W. W. KATTNER     2,502,050
HYDRAULIC BRAKE BLEEDING AND FILTERING SYSTEM
Filed Dec. 30, 1946
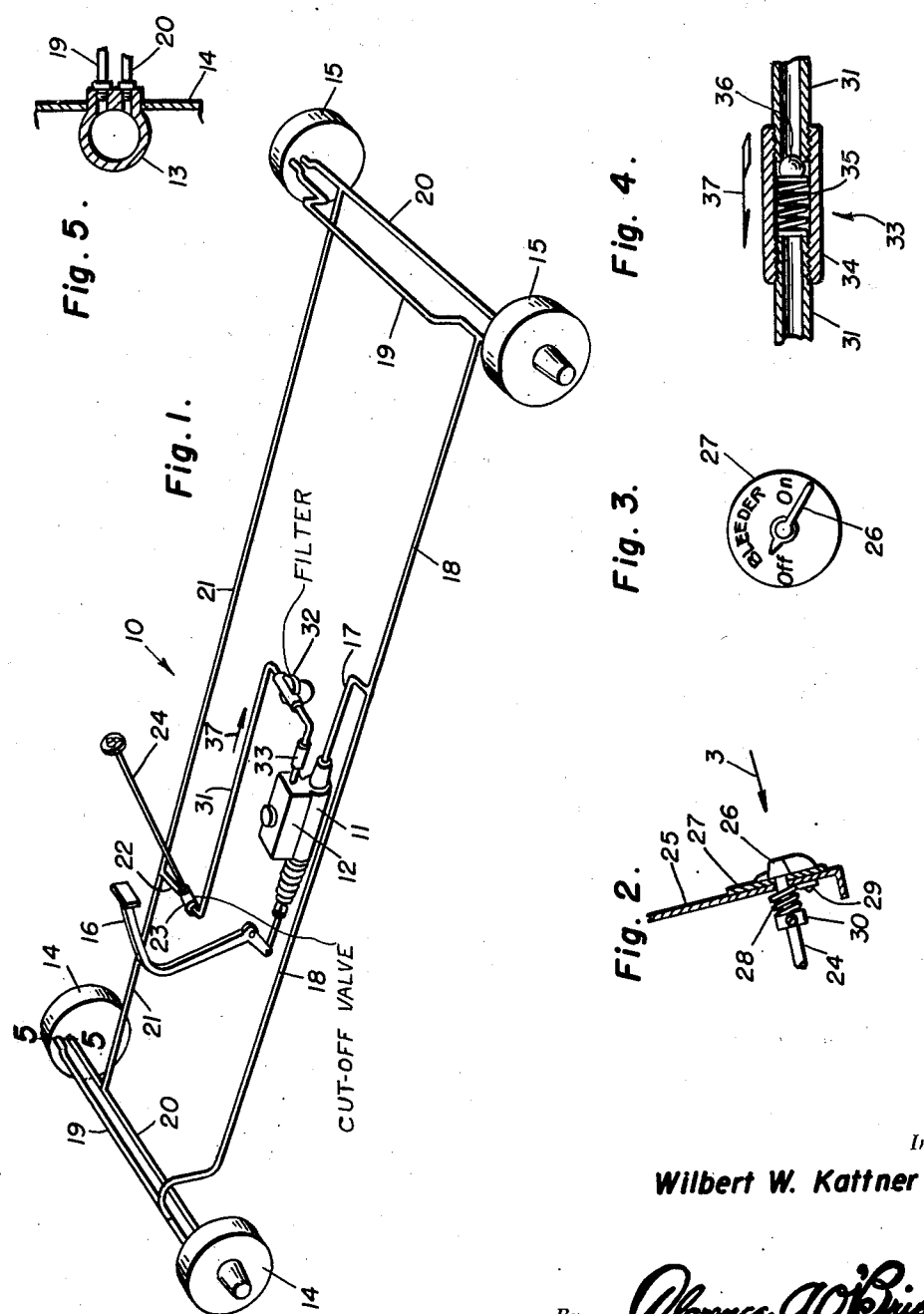
Inventor
Wilbert W. Kattner
By Clarence A. O'Brien
and Harvey B. Jacobson
Attorneys Patented Mar. 28, 1950

2,502,050

UNITED STATES PATENT OFFICE 2,502,050

HYDRAULIC BRAKE BLEEDING AND FILTERING SYSTEM

Wilbert W. Kattner, Waco, Tex., assignor of one-half to Mid-Tex Motors Inc., Waco, Tex.

Application December 30, 1946, Serial No. 719,237

1 Claim. (Cl. 60—54.5)

This invention relates to new and useful improvements and structural refinements in hydraulic brake systems for automobiles and similar vehicles, and the principal object of the invention is to provide a brake system of the character herein described which is particularly adapted to facilitate the so-called brake bleeding operation, so that the same may be conveniently and easily effected without the conventional difficulties or inconveniences which usually accompany the performance of the same.

A further object of the invention is to provide a hydraulic brake system which will substantially minimize the loss of brake fluid, such as is usually encountered when the brakes are bled.

Another object of the invention is to provide a hydraulic brake system which is simple in construction, dependable in operation and which may be easily controlled.

With the above more important objects in view and such other objects as may become apparent as this specification proceeds, the invention consists essentially of the construction and arrangement of parts as shown in the accompanying drawing in which:

Figure 1 is a perspective view of the invention;

Figure 2 is a fragmentary cross sectional detail of a control used in the same;

Figure 3 is an elevational view taken substantially in the direction of the arrow 3 in Figure 2;

Figure 4 is a cross sectional view of a check valve used in the invention, and

Figure 5 is a cross sectional view, taken substantially in the plane of the line 5—5 in Figure 1.

Like characters of reference are used to designate like parts in the specification and throughout the several views.

Referring now to the accompanying drawing in detail, more specifically to Figure 1, the invention consists of a brake system designated generally by the reference character 10, the same embodying in its construction a conventional master cylinder 11 equipped with a fluid reservoir 12 and the wheel cylinders 13 associated with the front and rear brake assemblies 14 and 15 respectively.

The actuation of the brake pedal 16 forces the brake fluid from the master cylinder 11 into a tube 17 from which the fluid pressure is equally distributed to the wheel cylinders 13 through the medium of the connecting tubes 18 and 19, as will be clearly apparent from the accompanying drawing.

The structure heretofore described is of a more or less conventional character and the essence of the invention resides in the provision of fluid return tubes 20, 21 which communicate with each of the wheel cylinders 13 and are connected to a further tube 22.

The tube 22 communicates with a suitable shut-off valve 23, this being actuated by a rod 24 which extends upwardly to the dashboard or instrument panel 25. The upper extremity of the rod 24 carries a combined pointer and handle 26 which is movable upon an identification plate 27 secured to the panel 25.

A suitable coil spring 28 is positioned on the rod 24, one end of the spring being secured to the panel 25 as at 29, while the remaining end thereof is anchored to a collar 30 rigidly mounted on the shaft 24. The identification plate 27 is inscribed to indicate the open and closed position of the valve 23 and matters are so arranged that the spring 28 will normally urge the rod 24 and the associated valve 23 to the closed position, as will be clearly understood.

The valve 23 is connected through the medium of a conduit 31 to the reservoir 12 of the master cylinder 11 and a suitable filter 32 of the type having a filter element removable for cleaning or replacement, is interposed in the length of the conduit for a purpose hereinafter to be more particularly described.

The conduit 31 also includes a check valve 33, this being of any suitable design such as exemplified in the accompanying Figure 4 by a sleeve 34 constituting a housing for a compression spring 35 which bears against a ball 36 and permits the flow of fluid in one direction only, that is, in the direction of the arrow 37.

When the invention is placed in use, the valve 23 is normally in its closed position and the brakes may be operated in the conventional, well-known manner.

However, when it is desired to bleed the brakes, it is only necessary to open the valve 23 and to "pump" the pedal 16. By so doing, the brake fluid will be forced by the master cylinder 11 through the tubes 17, 18 and 19 to the wheel cylinders 13 and the fluid in the wheel cylinders will be delivered through the tubes 20, 21, 22 and 31 to the master cylinder reservoir 12.

It will be apparent that in this manner, the brakes will be bled wtihout the conventionally experienced loss of fluid, since the fluid will be returned to the reservoir of the master cylinder.

Furthermore, the bleeding operation may be undertaken by one operator only, this being facilitated by the convenient location of the valve control 26. In other words, one operator may simultaneously actuate the pedal 16 and control the valve 23, while the conventional practice involving the independent actuation of the brake pedal by one operator and the separate, consecutive bleeding of the brakes at each wheel by another operator, will thus be completely eliminated. It will be observed that the present invention will also eliminate the conventional gravity actuated brake fluid dispensing tanks, such as are commonly employed when the bleeding operation is undertaken by one operator.

The filter 32, will, of course, effectively remove any foreign matter from the brake fluid before the latter is returned to the reservoir 12, while the check valve 33 will permit the fluid to flow in only one direction, as indicated by the arrow 37. Accordingly, fluid will be prevented from flowing from the reservoir 12 into the system through the conduit 31 upon the actuation of the pedal 16 when the brakes are bled.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangements of parts may be resorted to without departing from the spirit and scope of the invention as claimed.

What I claim as my invention is:

In a hydraulic brake system including a plurality of wheel cylinders and a master cylinder equipped with a fluid reservoir, a bleeding device comprising an outlet valve, fluid return tubes connecting each of said wheel cylinders to said valve, a conduit connecting said valve with a reservoir, a check valve in said conduit normally preventing flow to said cylinders through said conduit and tubes, the actuation of said master cylinder forcing the fluid through said wheel cylinders and through said valve into said reservoir when said outlet valve is opened, and a fluid filter provided in said conduit between the outlet valve and the check valve allowing the operation of the device as a closed system permanently installed on a vehicle.

WILBERT W. KATTNER.

REFERENCES CITED

The following references are of record in the file of this patent:

UNITED STATES PATENTS

| Number | Name | Date |
| --- | --- | --- |
| 1,985,812 | Banas | Dec. 25, 1934 |
| 2,209,784 | Maack et al. | July 30, 1940 |
| 2,255,676 | O'Reilly | Sept. 9, 1941 |

FOREIGN PATENTS

| Number | Country | Date |
| --- | --- | --- |
| 695,582 | Germany | Aug. 28, 1940 |